Jan. 9, 1934.  E. W. SMITH  1,942,667

STORAGE BATTERY SEPARATOR

Filed March 7, 1929

INVENTOR

Edward W. Smith

BY

Augustus A Stoughton

ATTORNEY.

Patented Jan. 9, 1934

1,942,667

UNITED STATES PATENT OFFICE 1,942,667

STORAGE BATTERY SEPARATOR

Edward W. Smith, Philadelphia, Pa., assignor to The Electric Storage Battery Company, Philadelphia, Pa., a corporation of New Jersey Application March 7, 1929. Serial No. 344,990

6 Claims. (Cl. 136—145)

This invention relates to separators for use between adjacent plates of storage batteries, and its object is to provide a protective coating to be applied to the surface of the separator which comes in contact with the active material of the positive plate to protect the separator against the oxidizing action which takes place at that surface.

The novel coating may also be applied to the interior surface of retaining envelopes used for holding the active material in place in the positive plate, such envelopes being used, for example, in the form of hard rubber tubes surrounding the active material and slotted circumferentially to provide access by the surrounding electrolyte to the active material within.

Separators for storage batteries have been made of thin wood diaphragms or of hard rubber sheets, the latter being perforated or slotted to provide for diffusion of the electrolyte. Where such separators come in contact with the lead peroxide of the positive plate during the operation of the battery, they are subjected to a certain amount of oxidizing action. This effect is quite marked in the case of wood and occurs to some extent in the case of hard rubber also.

The object of the present invention is to obviate or minimize this oxidizing action by applying a layer of inert porous material to the surface of the separator or retaining envelope which is adjacent to the active material, and my invention comprises the novel combination of materials for producing this porous layer of inert material and a novel method of applying the same.

In the accompanying drawing.

Figure 1:
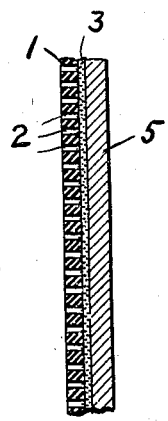
Figure 1 shows a section of hard rubber sheet perforated and coated on one side with a porous layer of inert material.
Figure 4:
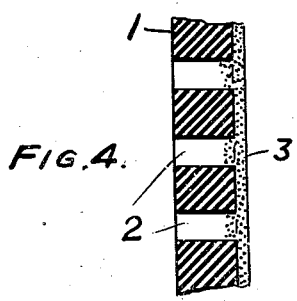
Figure 4 is an enlarged view of a portion of Figure 1 showing the porous inert layer entering into the slots of the separator.

In Figures 1 and 4 the hard rubber separator is designated by the numeral 1, with perforations at 2, and the layer of inert porous material is shown at 3.

Figure 2:
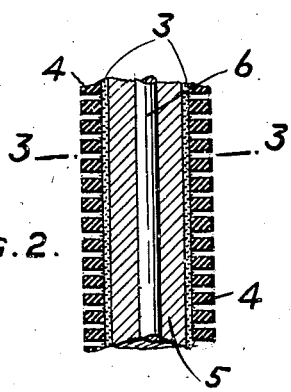
Figure 2 shows a vertical section of a tubular element of a positive plate, using an envelope of hard rubber slotted circumferentially, with a layer of porous inert material covering the inner surface of this envelope.
Figure 3:
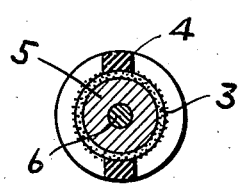
Figure 3 is a cross section on line 3—3 of Figure 2.

The active material of the plate is shown at 5. In Figures 2 and 3, the hard rubber tubular envelope is shown at 4, with the layer of porous inert material at 3, the active material of the plate being designated by the numeral 5, with a conducting rod or core 6.

The material for the porous inert layer is preferably prepared by mixing an aqueous solution of sodium silicate with a finely divided inert material, such as infusorial earth or other siliceous powder. The mixture is preferably made of a consistency of thick syrup and is applied as a thin coating to the surface to be protected and allowed to dry and harden.

A certain cementing action takes place between the sodium silicate and the finely divided siliceous material, so that the layer when dry is quite hard and adherent to the surface of the rubber. When this layer is subjected to the action of dilute sulphuric acid, the sodium silicate reacts with the sulphuric acid, sodium sulphate is formed, which dissolves out, leaving the inert layer of silica or siliceous material quite porous. This porosity is of importance in permitting diffusion of the electrolyte into the active material.

This inert porous material not only serves to protect the material of the separator or envelope from the oxidizing action of the positive active material but it also partially fills the perforations or slots in the separator or envelope and thus retards the escape of loose particles of the active material from the plate and therefore prolongs the life of the latter.

The foregoing is merely one embodiment of my invention. The layer of porous inert material described above may also be applied to the surface of a plain wood veneer or similar porous but oxidizible material adapted to be placed between the plates of a storage battery, the layer of inert material serving to keep it out of contact with the active material of the positive plate.

I do not intend to be limited in the practice of my invention save by the scope of the annexed claims.

I claim:

1. A separator for storage batteries which comprises in combination, a slotted element adapted to be interposed between active material of the positive and negative plates of a storage battery and which is decomposable by the oxidizing action of the positive plate and a layer comprising a mixture of sodium silicate and a siliceous powder applied to the surface of said element which is adapted to contact with the active material of the positive plate and to partially fill said slots.

2. A separator for storage batteries which comprises in combination, a slotted element adapted to be interposed between active material of the positive and negative plates of a storage battery and which is decomposable by the oxidizing action of the positive plate and a layer comprising a mixture of sodium silicate and infusorial earth applied to the surface of said element which is adapted to contact with the active material of the positive plate and to partially fill said slots.

3. A separator for storage batteries which comprises in combination, an element adapted to be interposed between active material of the positive and negative plates of a storage battery and which is decomposable by the oxidizing action of the positive plate and a layer comprising a mixture of sodium silicate and a siliceous powder applied to the surface of said element which is adapted to contact with the active material of the positive plate.

4. A separator for storage batteries which comprises in combination, an element adapted to be interposed between active material of the positive and negative plates of a storage battery and which is decomposable by the oxidizing action of the positive plate and a layer comprising a mixture of sodium silicate and infursorial earth applied to the surface of said element which is adapted to contact with the active material of the positive plate.

5. A separator for electric storage batteries which comprises, an element adapted to be interposed between the active material of the positive and negative plates of a storage battery and which is decomposable by the oxidizing action of the positive plate, and a layer of a substance applied to that surface of the element which is exposed to the active material of the positive plate, said substance being the residuum remaining after a mixture of sodium silicate and a siliceous powder has set and hardened on the element and has been immersed in dilute sulphuric acid.

6. A separator for electric storage batteries which comprises, an element having openings therethrough and adapted to be interposed between the active material of the positive and negative plates of a storage battery, and a substance closing said openings, said substance being the residuum remaining after a mixture of sodium silicate and a siliceous powder has set and hardened on the element and has been immersed in dilute sulphuric acid.

EDWARD W. SMITH.